United States Patent [19]

Miyoshi et al.

[11] 4,283,663
[45] Aug. 11, 1981

[54] HORIZONTAL DEFLECTION CIRCUIT IN A TELEVISION DEVICE

[75] Inventors: Tadayoshi Miyoshi, Yokohama; Shigeru Kashiwagi, Iwai, both of Japan

[73] Assignee: Victor Company of Japan, Ltd., Yokohama, Japan

[21] Appl. No.: 4,601

[22] Filed: Jan. 18, 1979

[30] Foreign Application Priority Data

Jan. 20, 1978 [JP] Japan .............................. 53/5169[U]

[51] Int. Cl.³ ............................................. H01J 29/70
[52] U.S. Cl. ..................................... 315/400; 315/401
[58] Field of Search ............................ 315/400, 401

[56] References Cited

U.S. PATENT DOCUMENTS

| 3,329,859 | 7/1967 | Lemke | 315/401 X |
| 3,806,853 | 4/1974 | Kikuchi | 315/400 X |
| 3,854,108 | 12/1974 | Horie et al. | 315/400 X |
| 3,944,884 | 3/1976 | Wilocki | 315/400 |
| 3,968,402 | 7/1976 | Sahara et al. | 315/400 X |

Primary Examiner—Malcolm F. Hubler
Attorney, Agent, or Firm—Haseltine and Lake

[57] ABSTRACT

A horizontal deflection circuit in a television device comprises a circuit for generating a saw-tooth waveform current for horizontal deflection, a horizontal coil supplied with the saw-tooth waveform current thus generated, a saturable reactor type linearity coil having a winding connected in series with the horizontal deflection coil, and a circuit for substantially supplying a correction current to the winding of the linearity coil. The correction current thus supplied varies in response to a temperature variation so that the inductance value of the linearity coil will become constant irrespective of the temperature variation.

4 Claims, 9 Drawing Figures

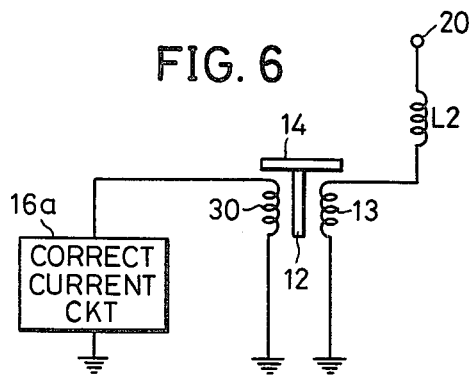
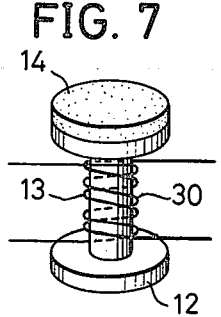
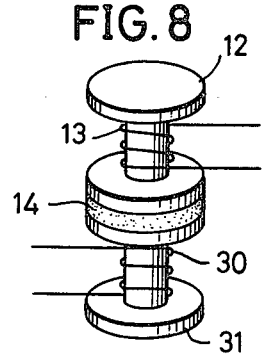
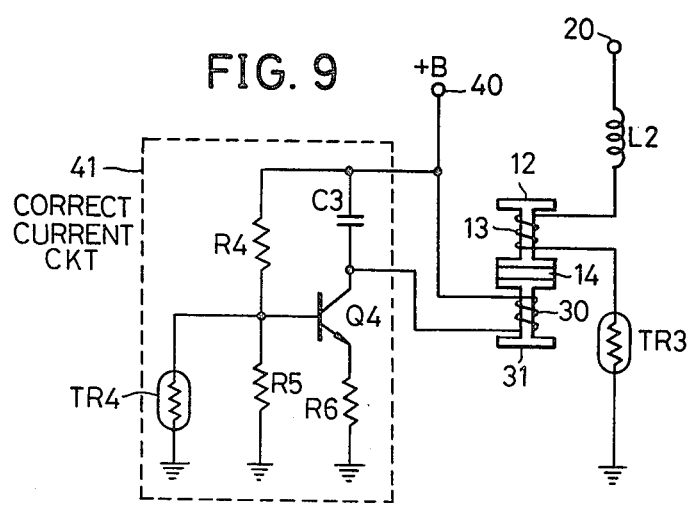

HORIZONTAL DEFLECTION CIRCUIT IN A TELEVISION DEVICE

BACKGROUND OF THE INVENTION

The present invention relates generally to horizontal deflection circuits for use in television devices such as image pickup tubes of television cameras (television camera tubes) or television picture tubes of television receivers. More particularly, the invention relates to a horizontal deflection circuit of this kind capable of carrying out horizontal deflection of constant deflection size with good linearity of the horizontal deflection operation in spite of temperature fluctuations.

In general, a horizontal deflection circuit for use in a television camera tube or a television picture tube is adapted to obtain from a horizontal synchronizing signal a current of a saw-tooth waveform for horizontal scanning and to pass this current through a horizontal deflection coil. Particularly in a horizontal deflection circuit for use in a television camera tube, good stability of linearity of horizontal deflection and deflection size is required. Furthermore, low power consumption, small size, and other features are required.

However, since a horizontal deflection coil has an electrical resistance component, in general, when a current of saw-tooth waveform is fed into the horizontal deflection coil, this current flowing through this coil becomes a current of a saw-tooth waveform whose straight-line portions are curved because of loss due to the above mentioned resistance component.

Accordingly, there has heretofore been a horizontal deflection circuit wherein a linearity correction circuit comprising a transformer, a resistor, and a power amplifier is connected to a horizontal deflection coil. This circuit is of a circuit arrangement wherein the primary winding of the transformer and the resistor are connected to the horizontal deflection coil, and the current detected by this resistor is supplied through the power amplifier to the secondary winding of the transformer. In this horizontal deflection circuit, the curved parts of the current waveform are corrented, and an operation of relatively good linearity and stability is carried out. In addition, there is also a circuit of this character wherein a thermistor is used for this resistor, and the operation is stabilized in spite of fluctuations of the ambient temperature.

These known horizontal deflection circuits, however, have a large number of circuit components. For this reason, they cannot be miniaturized, and their production cost is also high. Furthermore, these circuits are accompanied by problems such as high power consumption and their unsuitability particularly for camera tubes of portable television cameras.

Accordingly, there has been a horizontal deflection circuit wherein, instead of a large-size linearity correction circuit comprising components such as the above mentioned transformer, power amplifier, and resistor, a linearity coil of saturable reactor type is used in an attempt to realize miniaturization. This saturable reactor type linearity coil is of a construction, in general, wherein a winding is wound around a core to one end of which is closely attached a magnet for imparting a saturable reactor characteristic. This winding is connected in series to the horizontal deflection coil. As a result of a current flowing through the winding of this linearity coil, its inductance value varies, whereby linearity correction of the deflecting current is accomplished.

In a horizontal deflection circuit provided with this saturable reactor type linearity coil, since a linearity correction current is not caused to flow, the power consumption is low. Furthermore, since the small number of components are required, the circuit can be made small and has the feature of being suitable particularly for the camera tube of a portable television camera.

However, this saturable reactor type linearity coil is accompanied by a problem, as described hereinafter, in that its DC current versus inductance characteristic fluctuates with variation in the surrounding temperature. More specifically, when the temperature rises the inductance value of the coil decreases, while when the temperature falls, the inductance value of the coil increases. For this reason, a large deflection current flows at a high temperature to cause over-scanning, and the picture on the monitor screen becomes smaller than normal. On the other hand, at a low temperature, the deflection current becomes small to cause under-scanning, and the picture becomes larger than normal. Thus, the scanning size is subjected to the effect of temperature variation of the surrounding atmosphere, whereby the stability is poor.

SUMMARY OF THE INVENTION

Accordingly, it is a general object of the present invention to provide a novel and useful horizontal deflection circuit in a television device in which circuit the problems accompanying the above described saturable reactor type linearity coil are solved while its desirable characteristics are retained.

Another and specific object of the invention is to provide a horizontal deflection circuit in a television device of an organization wherein a saturable reactor type linearity coil is connected to a horizontal deflection coil, and a circuit for varying the current flowing through the linearity in response to temperature variation is further provided.

Still another object of the invention is to provide a horizontal deflection circuit in a television device in which circuit a saturable reactor type linearity coil is connected to a horizontal deflection coil, and a circuit for directly supplying a DC current responsive to temperature variation is further connected to the linearity coil.

A further object of the invention is to provide a horizontal deflection circuit in a television device in which circuit a saturable reactor type linearity coil is connected to a horizontal deflection coil, and a winding for electromagnetically coupling is further provided in the linearity coil, a DC current responsive to temperature variation being fed to the winding.

Other objects and further features of the present invention will be apparent from the following detailed description with respect to preferred embodiments of the invention when read in conjunction with the accompanying drawings.

BRIEF DESCRIPTION OF THE DRAWINGS

In the drawings:

FIG. 6 is a circuit diagram of an essential part of a third embodiment of the horizontal deflection circuit according to the invention;

FIG. 7 is a perspective view indicating the state of winding of one example of an essential part of the circuit shown in FIG. 6;

FIG. 8 is a schematic circuit diagram indicating the state of winding of another example of an essential part of the circuit shown in FIG. 6; and FIG. 9 is a circuit diagram of an essential part of a fourth embodiment of the horizontal deflection circuit according to the invention.

DETAILED DESCRIPTION

Figure 1:
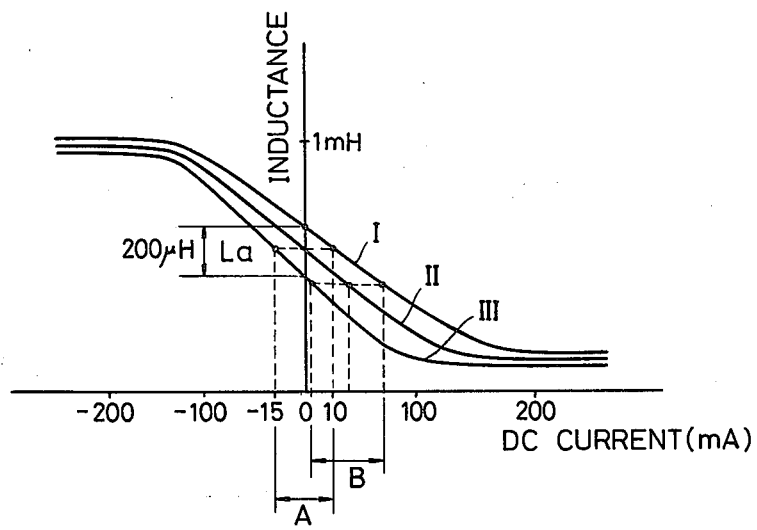
FIG. 1 is a graph indicating the DC current versus inductance characteristics of a saturable reactor type linearity coil.

In general, a saturable reactor type linearity coil exhibits a DC current versus inductance characteristic as indicated in FIG. 1. This figure is a graph wherein the abscissa represents applied DC current, while the ordinate represents inductance. Curve I indicates the inductance characteristic at a temperature of −10° C.; curve II indicates the inductance characteristic at +25° C. (room temperature); while curve III indicates the inductance characteristic at +60° C. As is apparent from this graph, in a state wherein the applied DC current is zero, a variation of the temperature in a range of, for example, −10° C. to +60° C. causes a variation in the inductance of the linearity coil of approximately 200 μH.

The inductance of the linearity coil varies in this manner in response to variation of the environmental temperature. For this reason, if the circuit organization is so arranged as to carry out linearity correction of the horizontal deflection current on the basis of only this relationship, the deflection current will disadvantageously fluctuate in response to temperature variation as described hereinbefore.

On one hand, when DC currents of +10 mA at −10° C., zero at +25° C., and −15 mA at +60° C., for example, are passed through the linearity coil, its inductance value becomes continually a constant value La. Therefore, according to the present invention, a correction current is caused to flow through the linearity coil so that its inductance value will always be constant irrespective of temperature variation. The invention will now be described with respect to preferred embodiments thereof.

Figure 2:
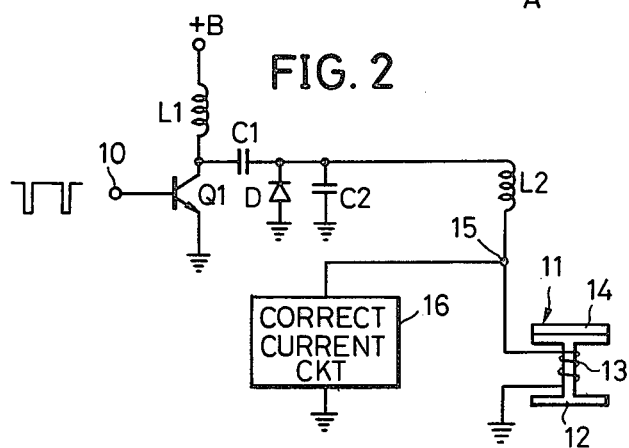
FIG. 2 is a circuit diagram of a first embodiment of the horizontal deflection circuit according to the invention.

In a first embodiment of the horizontal deflection circuit of the present invention as illustrated in FIG. 2, a horizontal synchronizing signal is introduced into the circuit through an input terminal 10 and applied to the base of a transistor Q1. The emitter of this transistor Q1 is grounded (earthed), and its collector is connected through a choke coil L1 to the +B power source. A signal obtained with phase inverted voltage waveform from the collector of this transistor Q1 becomes a saw-tooth waveform signal current as a result of its passing through a circuit comprising a coupling capacitor C1 for direct current blocking, a diode D for a damper, and a capacitor C2 for resonance which determines flyback time. This saw-tooth waveform current flows through a horizontal deflection coil L2. A saturable reactor type linearity coil 11 is connected between this horizontal deflection coil L2 and ground (earth). This saturable reactor type linearity coil 11, as is known, has a bobbin-shaped core 12, a coil winding 13 wound around the core 12, and a permanent magnet 14 attached to one end of the core for the purpose of imparting saturable reactor characteristic.

A correction current circuit 16 is connected to a junction point 15 between the horizontal deflection coil L2 and the linearity coil 11. This correction current circuit 16 has a positive power source and a negative power source whose current outputs vary in response to variation of the surrounding temperature. The output correction current of this correction current circuit 16 varies as indicated by range A or B indicated in FIG. 1 in response to surrounding temperature variation.

Accordingly, the curved state of the straight-line parts of the waveform of the saw-tooth waveform current flowing through the horizontal deflection coil L2 is corrected, as is known, by the saturable reactor type linearity coil 11, and the linearity of the horizontal deflection is corrected. Furthermore, since the above mentioned correction current varying in response to variation in the surrounding temperature from the correction current circuit 16 flows through the saturable reactor type linearity coil 11, its inductance value is constant in spite of the surrounding temperature variation. Accordingly, the horizontal deflection current value does not vary in spite of the surrounding temperature variation. Therefore, over-scanning or under-scanning, etc., does not occur, and horizontal deflection of stable scanning size is accomplished.

Figure 3:
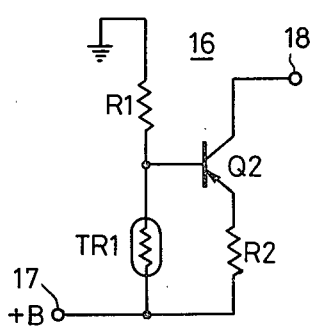
FIG. 3 is a circuit diagram of one example of a correction current circuit used in the circuit shown in FIG. 2 according to the invention.

In the case where a correction current which varies within the range of positive current as indicated by range B in FIG. 1 in response to temperature variation is caused to flow through the linearity coil 11, the correction current circuit 16 can be arranged as a circuit having only a single positive power source as the power source as shown in FIG. 3. In this circuit, a thermistor TR1 is connected between the base of a transistor Q2 and a +B power source terminal 17; a resistor R1 is connected between the base of the transistor Q2 and ground; and a resistor R2 is connected between the collector of the transistor Q2 and the terminal 17.

Then, when the temperature falls, for example, the resistance value of the thermistor increases; the voltage between the base and emitter of the transistor Q1 becomes high; and the collector current thereof increases. The collector current of the transistor Q2 is led out through a terminal 18 and supplied the above mentioned junction point 15. Conversely, when the temperature rises, the collector current led out becomes small. Thus, a correction current varying as within the range B in response to temperature variation is supplied to the junction point 15.

Figure 4:
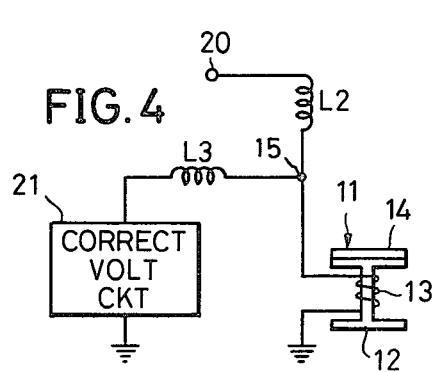
FIG. 4 is a circuit diagram of an essential part of a second embodiment of the horizontal deflection circuit according to the invention.

A second embodiment of the horizontal deflection circuit of the invention will now be described with reference to FIG. 4. In FIG. 4, those parts which are the same or equivalent to corresponding parts in FIG. 2 are designated by like reference numerals and characters and will not be described in detail again. A saw-tooth wave generated by a saw-tooth wave generating circuit similar to that shown in FIG. 2 is introduced into this circuit through a terminal 20 and is supplied to a horizontal deflection coil L2. A correction voltage circuit 21 is connected through a choke coil L3 to the junction point 15 between the horizontal deflection coil L2 and a saturable reactor type linearity coil 11. The choke coil L3 has an amply high impedance with respect to the horizontal deflection frequency of 15.75 KHz. As a result, a desired correction current can be caused to flow through the junction point 15 also by voltage drive due to the correction voltage circuit 21.

Figure 5:
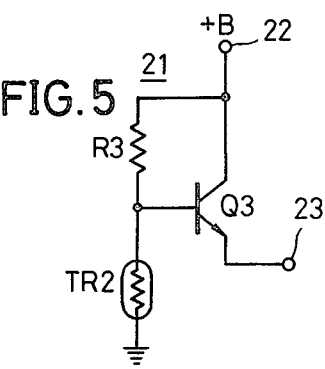
FIG. 5 is a circuit diagram of one example of a correction voltage circuit used in the circuit shown in FIG. 4 according to the invention.

In the case where the correction voltage circuit 21 is to be of a circuit organization wherein a single power source is used similarly as in the circuit illustrated in FIG. 3, a circuit as shown in FIG. 5 is used. In this circuit, a thermistor TR2 is connected between the base of a transistor Q3 and ground, and a resistor R3 is connected between the base of the transistor Q3 and a +B power source terminal 22. The collector of the transistor Q3 is connected to the terminal 22. A terminal 23 connected to the emitter of the transistor Q3 is connected to the choke coil L3. The voltage led out through the terminal 23 varies in response to temperature variation, and the correction current flowing by way of the choke coil L3 through the junction point 15 also varies so that the inductance value of the linearity coil 11 will always be constant.

In a third embodiment of the horizontal deflection circuit of the invention as shown in FIG. 6, a winding 30 of a number of winding turns greater than that of the winding 13 is connected to a correction current circuit 16a. As shown in FIG. 7, this winding 30 is wound concentrically with the winding 13 on a core 12 on which the winding 13 is wound. The ratio of the winding turns of the windings 30 and 13 is selected at a value of the order of 10:1.

According to the present embodiment of the invention, the current supplied to the winding 30 from the correction current circuit 16a may be of a value less than that of the output current of the current circuit 16 of the embodiment of the invention illustrated in FIG. 2 in which correction is supplied directly to the junction point 15. Accordingly, the power consumption becomes still less than in the embodiment of the invention shown in FIG. 2. As a modification, a choke coil L3 and a correction voltage circuit 21 as in the embodiment of the invention shown in FIG. 4 may be used in place of the correction current circuit 16a.

In the present embodiment of the invention, if the number of winding turns of the winding 30 is made excessively large, the distributed capacity of the winding 30 will become of a value which cannot be neglected, and ringing will occur. Accordingly, this problem can be solved by an organization such as that of the embodiment of the invention shown in FIG. 8.

In this embodiment of the invention illustrated in FIG. 8, the windings 13 and 30 are not wound concentrically on the same core 12. The winding 13 of the linearity coil connected to the horizontal deflection coil L2 is wound around the core 12. A magnet 14 is secured at its one surface to the outer surface of one flange of the bobbin-shaped core 12 and at its opposite surface to the outer surface of one flange of another bobbin-shaped core 31. The winding 30 connected to the correction current circuit 16a is wound around this core 31.

According to the present embodiment of the invention, the core 12 around which the winding 13 is wound and the core 31 around which the winding 30 is wound are electro-magnetically coupled through the magnet 14 interposed therebetween. For this reason, there is a DC manner coupling between the coils 30 and 31, but the AC manner coupling is of very low degree. For this reason, ringing will not occur even if the number of winding turns of the winding 30 is made large.

In a fourth embodiment of the horizontal deflection circuit of the invention as illustrated in FIG. 9, a winding 13 of a saturable reactor type linearity coil of the same organization as that shown in FIG. 8 and a positive-polarity thermistor TR3 are connected in series to a horizontal deflection coil L2. A winding 30 is connected to a +B power source terminal 40 and the collector of a transistor Q4 of a correction current circuit 41. A capacitor C3 is connected between the collector of the transistor Q4 and the power supply terminal 40, and a resistor R4 is connected between the base of the transistor Q4 and the terminal 40. A resistor R4 is connected between the emitter of the transistor Q4 and the ground. Furthermore, a thermistor TR4 and a resistor are connected in parallel between the base of the transistor Q4 and the ground.

The resistance value of the thermistor TR4 varies in response to surrounding temperature variation, and the current flowing through the winding 30 varies. As a consequence, a correction current such as to cause the inductance of the winding 13 to become constant is induced in this winding 13. In the circuit of the present embodiment of the invention, since the thermistor TR3 is connected to the winding 13, the resistance loss in the thermistor TR3 becomes large when the surrounding temperature becomes high. Accordingly, the correction is prevented from becoming excessively large at the time of high temperature.

Further, this invention is not limited to these embodiments but various variations and modifications may be made without departing from the scope of the invention.

What is claimed is:

1. A horizontal deflection circuit in a television device comprising:
   a circuit for generating a saw-tooth waveform current for horizontal deflection;
   a horizontal deflection coil supplied with the saw-tooth waveform current thus generated;
   a saturable reactor type linearity coil comprising a coil winding connected in series with the horizontal deflection coil, a core wound therearound with the coil winding, and a permanent magnet for applying a magnetic field to the core;
   means for supplying a correction current to the junction point between the horizontal deflection coil and the coil winding of the linearity coil; and
   the correction current thus supplied varying in response to a temperature variation so that the inductance value of the linearity coil will become constant irrespective of the temperature variation.

2. A horizontal deflection circuit as claimed in claim 1 in which the correction current supplying means comprises a voltage circuit which varies its voltage in response to the temperature variation and a choke coil connected to the voltage circuit and operating to supply the correction current directly to the junction point between the horizontal deflection coil and the linearity coil.

3. A horizontal deflection circuit as claimed in claim 1 further comprising a resistance element connected in series with the winding of the linearity coil and having a resistance value responsive to temperature.

4. A horizontal deflection circuit in a television device comprising:

a circuit for generating a saw-tooth waveform current for horizontal deflection;

a horizontal deflection coil supplied with the saw-tooth waveform current thus generated;

a saturable reactor type linearity coil comprising a first core, a permanent magnet for applying a magnetic field to the first core, and a first winding wound around the first core; and correction current supplying means comprising a second core electromagnetically coupled with the first core through the permanent magnet, a second winding wound around the second core, and means for supplying to the second winding a current which varies in response to the temperature variation thereby to cause the correction current to flow substantially through the first winding so that the inductance value of the linearity coil will become constant irrespective of the temperature variation.

* * * * *